United States Patent
Asfaw et al.

(10) Patent No.: US 12,413,887 B1
(45) Date of Patent: Sep. 9, 2025

(54) SINTERED FILTER MATERIAL AND GRILL DESIGN TO REDUCE AND MITIGATE WIND NOISE FOR PERCEPTION

(71) Applicant: Waymo LLC, Mountain View, CA (US)

(72) Inventors: Michael Asfaw, San Carlos, CA (US); Randall Adams, Livermore, CA (US); Cheng-Han Wu, San Jose, CA (US); Jun Hou, Shanghai (CN)

(73) Assignee: Waymo LLC, Mountain View, CA (US)

( * ) Notice: Subject to any disclaimer, the term of this patent is extended or adjusted under 35 U.S.C. 154(b) by 203 days.

(21) Appl. No.: 18/240,473

(22) Filed: Aug. 31, 2023

Related U.S. Application Data

(60) Provisional application No. 63/402,524, filed on Aug. 31, 2022.

(51) Int. Cl.
   *H04R 1/08* (2006.01)
   *H04R 1/02* (2006.01)
   *B60W 60/00* (2020.01)

(52) U.S. Cl.
   CPC ............ *H04R 1/086* (2013.01); *H04R 1/028* (2013.01); *B60W 60/00* (2020.02); *B60W 2420/54* (2013.01); *H04R 2410/07* (2013.01); *H04R 2499/13* (2013.01)

(58) Field of Classification Search
   CPC ................ H04R 1/086; H04R 2410/07; H04R 2499/13; B60W 60/00; B60W 2420/54; H05K 5/0214
   See application file for complete search history.

(56) References Cited

U.S. PATENT DOCUMENTS

| | | |
|---|---|---|
| 5,491,478 A | 2/1996 | de la Luz et al. |
| 5,812,496 A | 9/1998 | Peck |
| 7,136,494 B2 | 11/2006 | Watson et al. |
| 7,218,742 B2 | 5/2007 | Kay et al. |
| 8,272,517 B2 | 9/2012 | Horie et al. |

(Continued)

FOREIGN PATENT DOCUMENTS

| | | |
|---|---|---|
| CN | 200956661 Y | 10/2007 |
| KR | 101146513 B1 | 5/2012 |

OTHER PUBLICATIONS

D. Ugarte et al., "Acoustical Characterization of Impermeable Membranes: Hearing Aid Applications", Proceedings of the 25th Annual International Conference of the IEEE Engineering in Medicine and Biology Society (IEEE Cat. No. 03CH37439), Sep. 17-21, 2003.

(Continued)

*Primary Examiner* — Jason R Kurr
(74) *Attorney, Agent, or Firm* — MCDONNELL BOEHNEN HULBERT & BERGHOFF LLP

(57) ABSTRACT

A sensor module comprising a housing defining an internal cavity having a proximal opening and a distal opening, a first barrier that covers the proximal opening of the internal cavity, a second barrier that is positioned between the first barrier and the proximal opening of the internal cavity, at least one microphone acoustically coupled to the distal opening of the internal cavity, and a porous plastic material that fills a particular portion of the internal cavity located between the proximal opening and the distal opening.

20 Claims, 16 Drawing Sheets

(56) References Cited

U.S. PATENT DOCUMENTS

| | | |
|---|---|---|
| 9,078,063 B2 | 7/2015 | Loeppert et al. |
| 9,132,270 B2 | 9/2015 | Vaishya |
| 9,204,229 B2 | 12/2015 | Koester et al. |
| 9,253,297 B2 | 2/2016 | Abe et al. |
| 9,414,141 B2 | 8/2016 | Cohen et al. |
| 10,587,942 B1 | 3/2020 | Minervini et al. |
| 10,631,073 B2 | 4/2020 | Schipper |
| 11,303,980 B2 | 4/2022 | Chng et al. |
| 11,729,538 B2 | 8/2023 | Chng et al. |
| 2007/0003081 A1 | 1/2007 | Ram et al. |
| 2007/0113964 A1 | 5/2007 | Crawford et al. |
| 2010/0111345 A1 | 5/2010 | Andrea et al. |
| 2011/0255728 A1 | 10/2011 | Abe et al. |
| 2017/0366889 A1 | 12/2017 | Schipper |
| 2018/0103307 A1 | 4/2018 | Hansson |
| 2019/0191242 A1 | 6/2019 | Shin et al. |
| 2019/0277962 A1 | 9/2019 | Ingram et al. |
| 2020/0084539 A1 | 3/2020 | Lippert et al. |
| 2020/0280782 A1 | 9/2020 | Kleinheincz et al. |
| 2021/0352393 A1* | 11/2021 | Diego Regla .......... H04R 1/086 |
| 2022/0030341 A1 | 1/2022 | Chng et al. |
| 2023/0092860 A1* | 3/2023 | Knutzen ................ H04R 1/222 |
| | | 381/386 |
| 2023/0146074 A1* | 5/2023 | Qureshi ................ H04R 1/086 |
| | | 381/355 |
| 2023/0336901 A1* | 10/2023 | Sun ...................... H04R 1/1075 |
| 2023/0370766 A1* | 11/2023 | Zhang ................... C08J 9/0085 |

OTHER PUBLICATIONS

Porex, "Passport to Performance: Maximizing Device Capabilities with Sintered Particles," 2020.
Saati S.p.A., "Acoustex HD—product news," 2017.

* cited by examiner

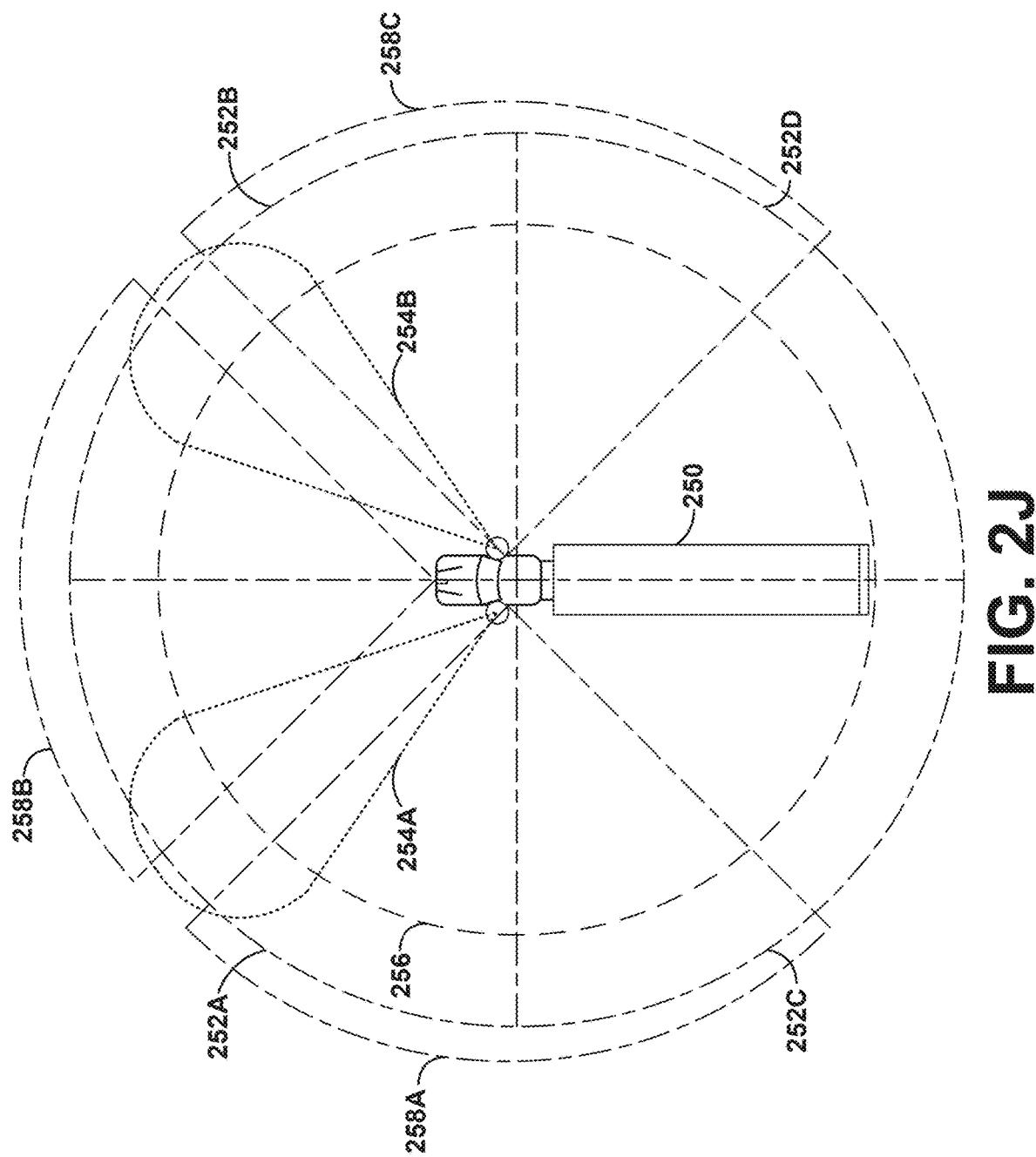

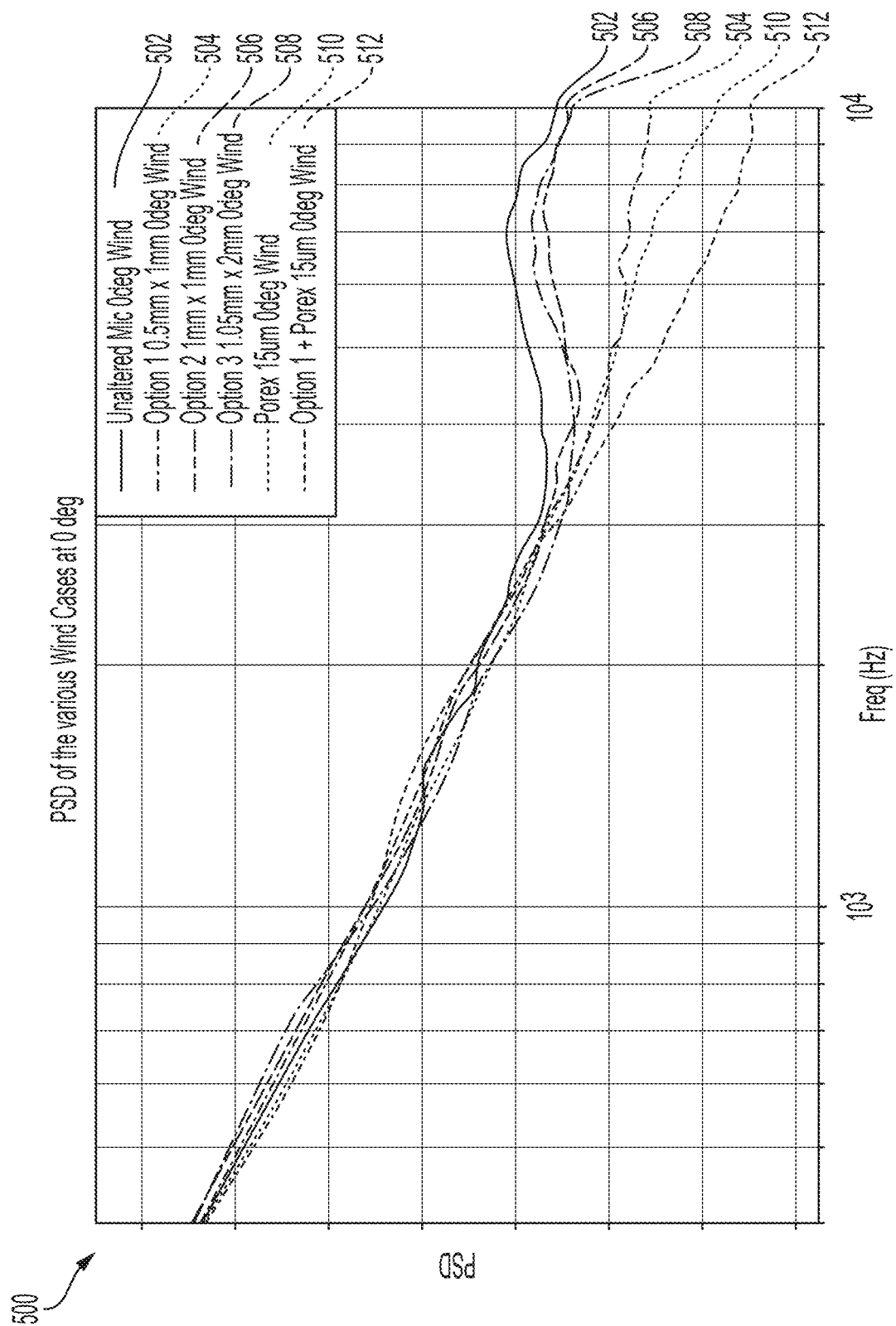

SINTERED FILTER MATERIAL AND GRILL DESIGN TO REDUCE AND MITIGATE WIND NOISE FOR PERCEPTION

CROSS-REFERENCE TO RELATED APPLICATIONS

This application claims priority to Provisional Patent Application No. 63/402,524, filed Aug. 31, 2022, which is incorporated herein by reference.

BACKGROUND

Unless otherwise indicated herein, the description in this section is not prior art to the claims in this application and is not admitted to be prior art by inclusion in this section.

A vehicle can include one or more sensors mounted to the outside of the vehicle that are configured to collect audio signals about the environment in which the vehicle operates. The outside location exposes the one or more sensors to a number of environmental hazards, including precipitation, dust, debris, high winds, ice, and extreme temperatures.

The one or more sensors can include acoustic sensors, such as a microphone. Microphones often suffer from high wind noise pickup when operating on vehicles driving at higher speeds and/or in weathered conditions. Because of this, operational noise data is often clouded with infiltrating noises, making it difficult for the perception of important noises, such as emergency sirens and the like.

SUMMARY

A vehicle may include various sensors to detect aspects of the environment surrounding the vehicle. In some examples, the vehicle includes a microphone module containing one or more microphones for detecting sounds originating outside of the vehicle. In order to filter out unwanted noise data, the microphone module may be configured to include calculated aspects to simultaneously block out some of the extraneous data while still allowing target measuring noises to go through.

For example, in some embodiments, a sensor module is disclosed that includes a housing defining an internal cavity such that the internal cavity has a proximal opening and a distal opening. The sensor module further includes a first barrier that covers the proximal opening of the internal cavity and a second barrier that is positioned between the first barrier and the proximal opening of the internal cavity. In some embodiments, at least one microphone is also acoustically coupled to the distal opening of the internal cavity and a porous plastic material fills a particular portion of the internal cavity located between the proximal opening and the distal opening.

In some examples, a vehicle includes a microphone module that includes a housing defining an internal cavity such that the internal cavity has a proximal opening and a distal opening. The sensor module further includes a first barrier that covers the proximal opening of the internal cavity and a second barrier that is positioned between the first barrier and the proximal opening of the internal cavity. In some embodiments, at least one microphone is also acoustically coupled to the distal opening of the internal cavity and a porous plastic material fills a particular portion of the internal cavity located between the proximal opening and the distal opening.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 2J is an illustration of a field of view for various sensors, according to example embodiments.

FIG. 5 depicts a chart that graphs the power spectral density (PSD) of the various wind cases at 0 degrees, according to example embodiments.

DETAILED DESCRIPTION

Figure 1:
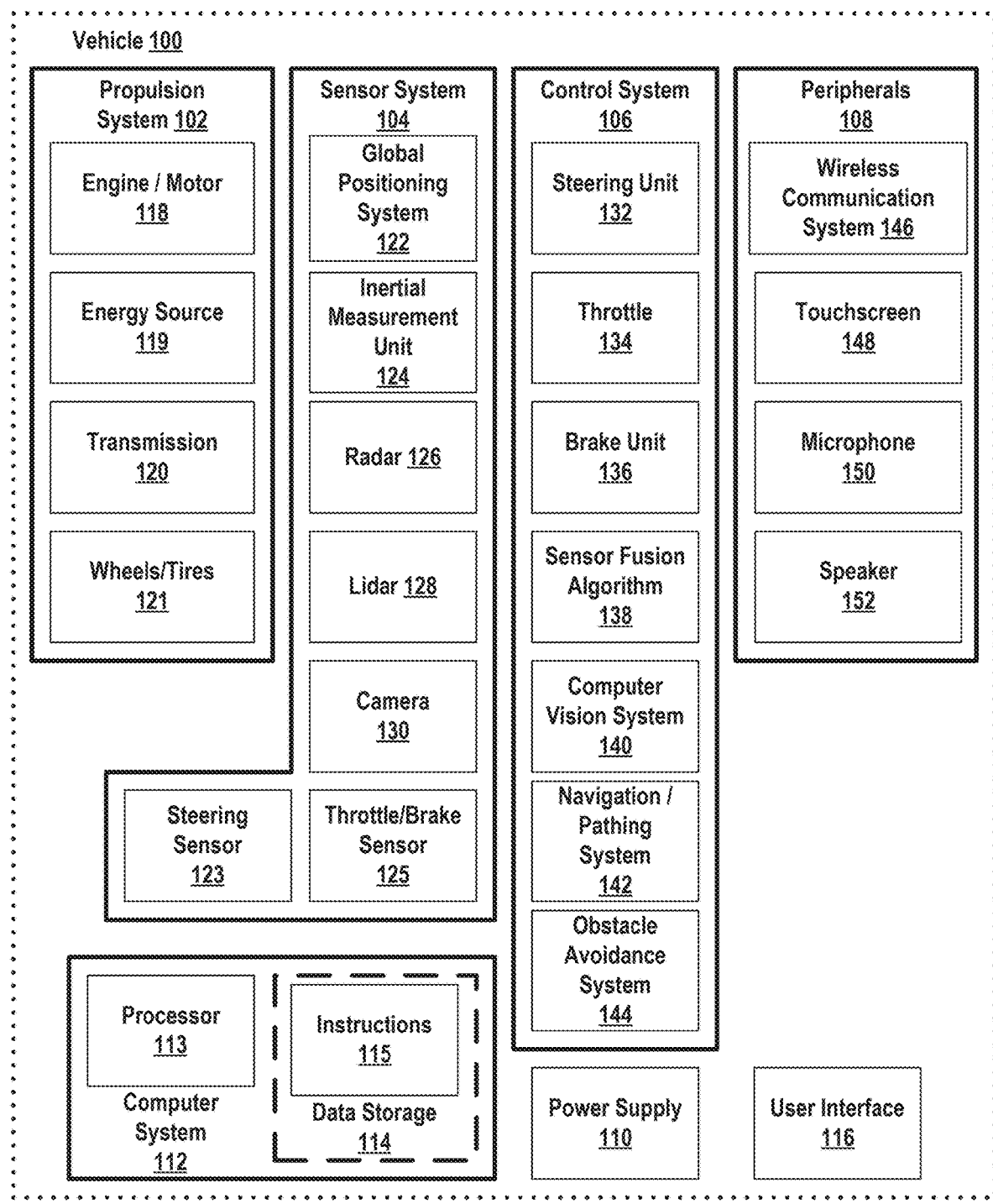
FIG. 1 is a functional block diagram illustrating a vehicle, according to example embodiments.

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations.

When used herein, the terms "water tight seal" and "water impermeable" do not require that all water is provided from entry in any condition, such as long term submersion. A water tight seal may be a seal that prevents water entry from water spray, water jets, and/or limited submersion. For example, a water tight seal as used herein may have an Ingress Protection ("IP") rating of at least IP62, IP63, IP64, IP65, IP66, or IP67. Similarly, a "dust tight seal" as used herein may not prevent all dust from entry. A dust tight seal prevents dust from entering in sufficient quantities to interfere with satisfactory operation of the device. For example, a dust tight seal may have a solids rating of at least IP5x or IP6x.

A vehicle, such as an autonomous vehicle, includes a number of external sensors for detecting aspects of the environment around the vehicle. Various types of active sensors, such as camera, LIDARs, RADARs, SONARs, etc., may be included in a vehicle to detect obstacles or objects in an environment of the vehicle and thereby facilitate accident avoidance and/or autonomous operation, among other possibilities. In addition, it can be advantageous to include sensors that can detect audio signals that represent abnormal and safety-critical events such as sirens, horns, back-up alarms, railroad crossing signals, and screeching brakes.

In some embodiments, a vehicle is equipped with one or more microphone modules exposed to the air outside of the vehicle. The microphone modules include one or more microphones that detect sound outside of the vehicle and transmit audio data to a processor. The processor can analyze the audio data to determine if specific sounds were detected, such as sirens.

The microphone module includes a housing having an internal cavity that includes a proximal opening and a distal opening. One or more microphones are coupled to the distal opening of the internal cavity. A first barrier is positioned proximate and covers the proximal opening of the internal cavity. In some embodiments, the first barrier includes a rigid structure having one or more holes or pores therein, such as a metal or plastic mesh. As such, the first barrier inhibits the passage of debris through the aperture, while allowing air and sound to enter the housing through the pores therein. A second barrier is positioned between the first barrier and proximal opening of the internal cavity. In some embodiments, the second barrier is configured to inhibit the passage of dust and reduces the ingress by water. In addition, in a particular portion of the internal cavity located between the proximal opening and the distal opening, a porous plastic material can be disposed.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, tractor trailers, etc.), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, robot devices, etc. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles, etc.) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), emergency braking, etc.), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway, etc.) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion, etc.) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations. Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118, etc.). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear, etc.).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection, etc.) or in an incoherent detection mode (i.e., time-of-flight mode). In some embodiments, the one or more detectors of the lidar 128 may include one or more photodetectors, which may be especially sensitive detectors (e.g., avalanche photodiodes, etc.). In some examples, such photodetectors may be capable of detecting single photons (e.g., single-photon avalanche diodes (SPADs), etc.). Further, such photodetectors can be arranged (e.g., through an electrical connection in series, etc.) into an array (e.g., as in a silicon photomultiplier (SiPM), etc.). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, a night vision camera, etc.) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve, a carburetor, etc.). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, one or more machine-learned models, etc.) operable to process and analyze images in an effort to determine objects that are in motion (e.g., other vehicles, pedestrians, bicyclists, animals, etc.) and objects that are not in motion (e.g., traffic lights, roadway boundaries, speedbumps, potholes, etc.). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, interior microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic, etc.) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, control system 106, etc.), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle, etc.) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices, etc.).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras, etc.), one or more lidars, one or more radars, one or more inertial sensors, one or more humidity sensors, one or more acoustic sensors (e.g., microphones, sonar devices, etc.), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; one or more lidars, cameras, and radars; etc.).

Note that the number, location, and type of sensor systems (e.g., 202, 204, etc.) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, to adapt to specialized environmental or application circumstances, etc.). For example, the sensor systems (e.g., 202, 204, etc.) could be disposed in various other locations on the vehicle (e.g., at location 216, etc.) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, inertial sensors, humidity sensors, and acoustic sensors (e.g., microphones, sonar devices, etc.). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar sensors. For example, the lidar sensors could include a plurality of light-emitter devices arranged over a range of angles with respect to a given plane (e.g., the x-y plane, etc.). For example, one or more of the sensor systems 202, 204, 206, 208, 210, 212, 214, and/or 218 may be configured to rotate or pivot about an axis (e.g., the z-axis, etc.) perpendicular to the given plane so as to illuminate an environment surrounding the vehicle 200 with light pulses. Based on detecting various aspects of reflected light pulses (e.g., the elapsed time of flight, polarization, intensity, etc.), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz, etc.). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208, 210, etc.), to actively scan the environment near the back of the vehicle 200 for the presence of radio-reflective objects. Similarly, one or more radars can be located near the front of the vehicle 200 (e.g., sensor systems 212, 214, etc.) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors, etc.) used to sense a surrounding environment of vehicle 200. Acoustic sensors may include microphones (e.g., piezoelectric microphones, condenser microphones, ribbon microphones, microelectromechanical systems (MEMS) microphones, etc.) used to sense acoustic waves (i.e., pressure differentials) in a fluid (e.g., air, etc.) of the environment surrounding the vehicle 200. Such acoustic sensors may be used to identify sounds in the surrounding environment (e.g., sirens, human speech, animal sounds, alarms, etc.) upon which control strategy for vehicle 200 may be based. For example, if the acoustic sensor detects a siren (e.g., an ambulatory siren, a fire engine siren, etc.), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1, etc.). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 2A:
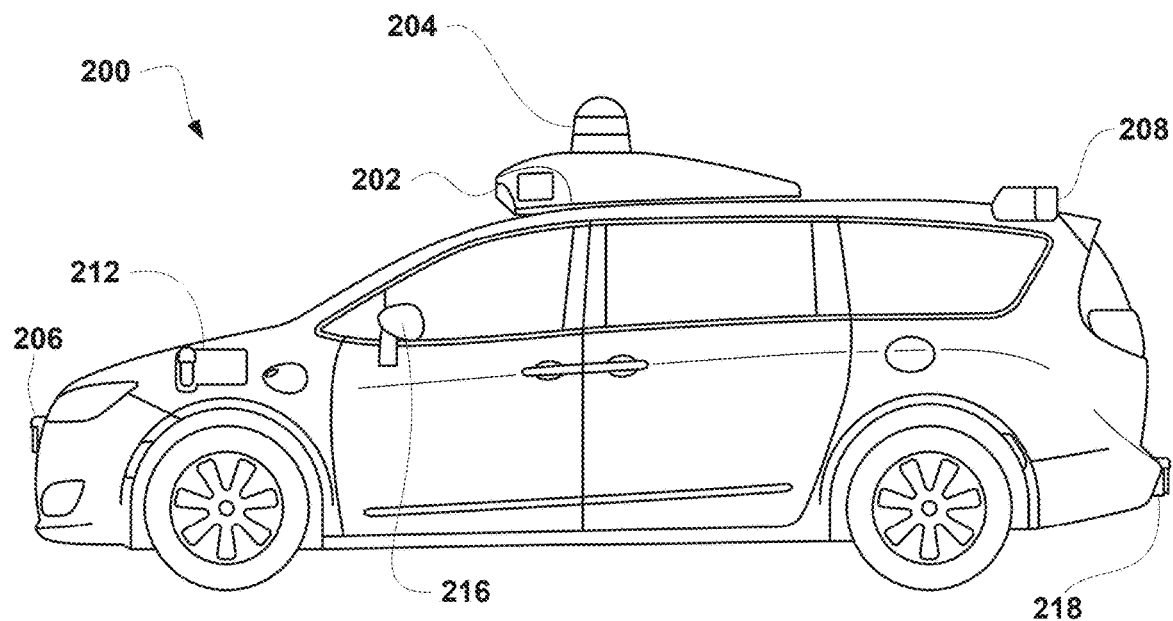
FIG. 2A is an illustration of a physical configuration of a vehicle, according to example embodiments.
Figure 2B:
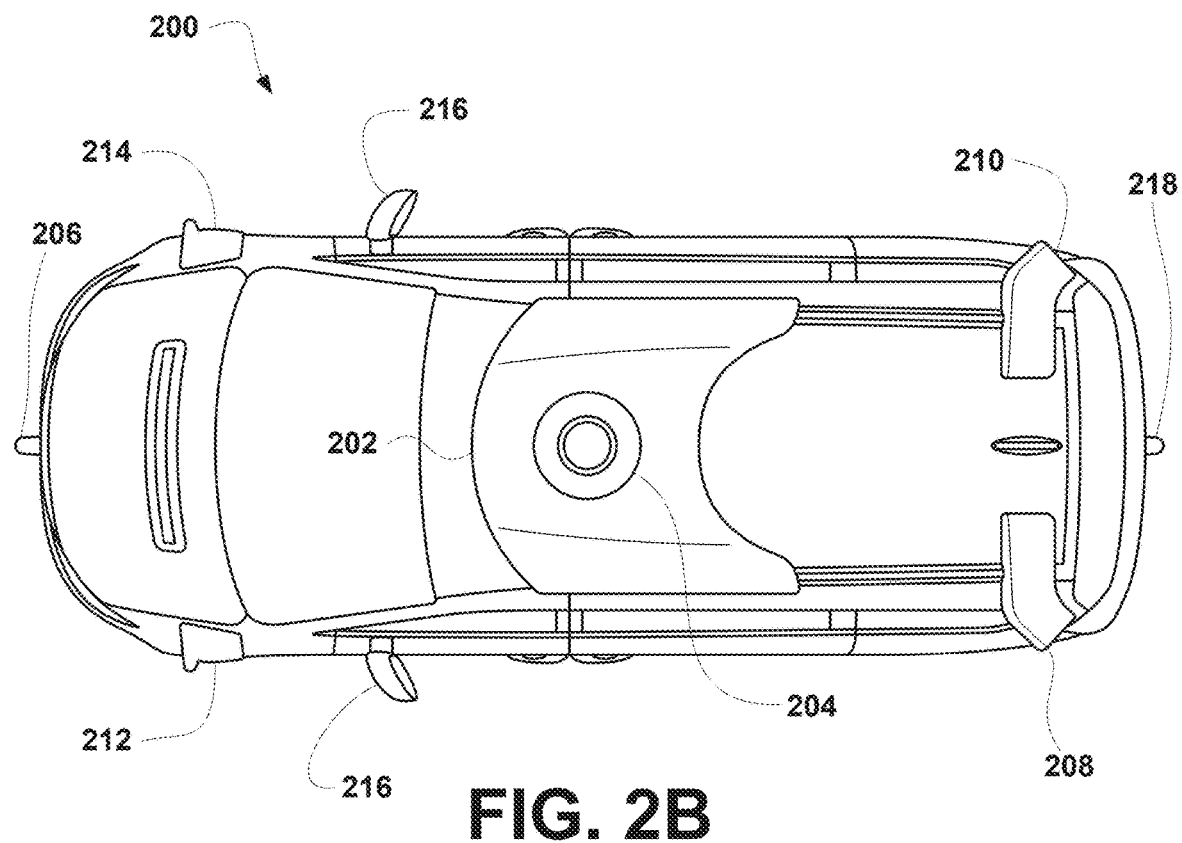
FIG. 2B is an illustration of a physical configuration of a vehicle, according to example embodiments.
Figure 2C:
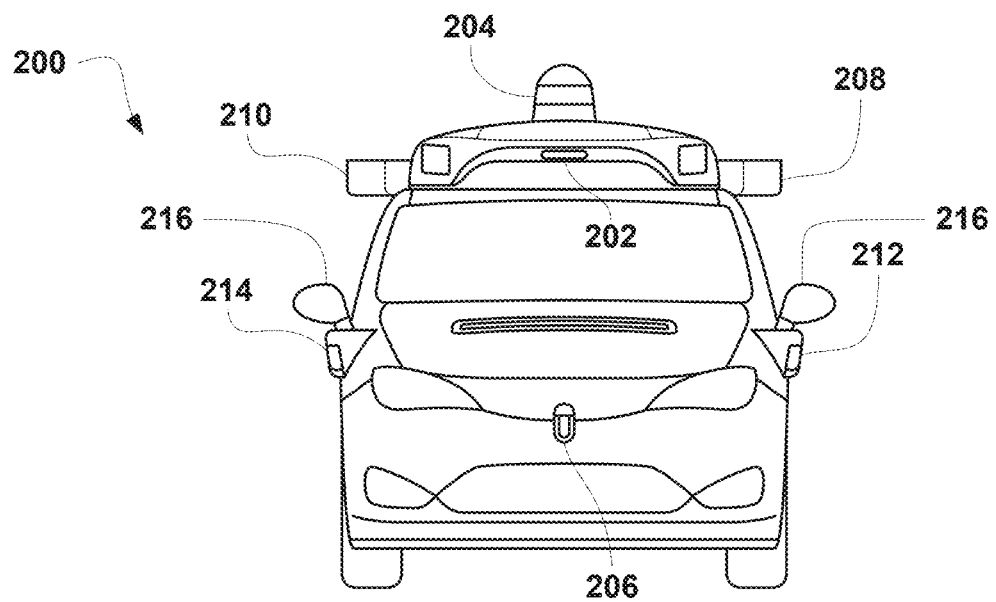
FIG. 2C is an illustration of a physical configuration of a vehicle, according to example embodiments.
Figure 2D:
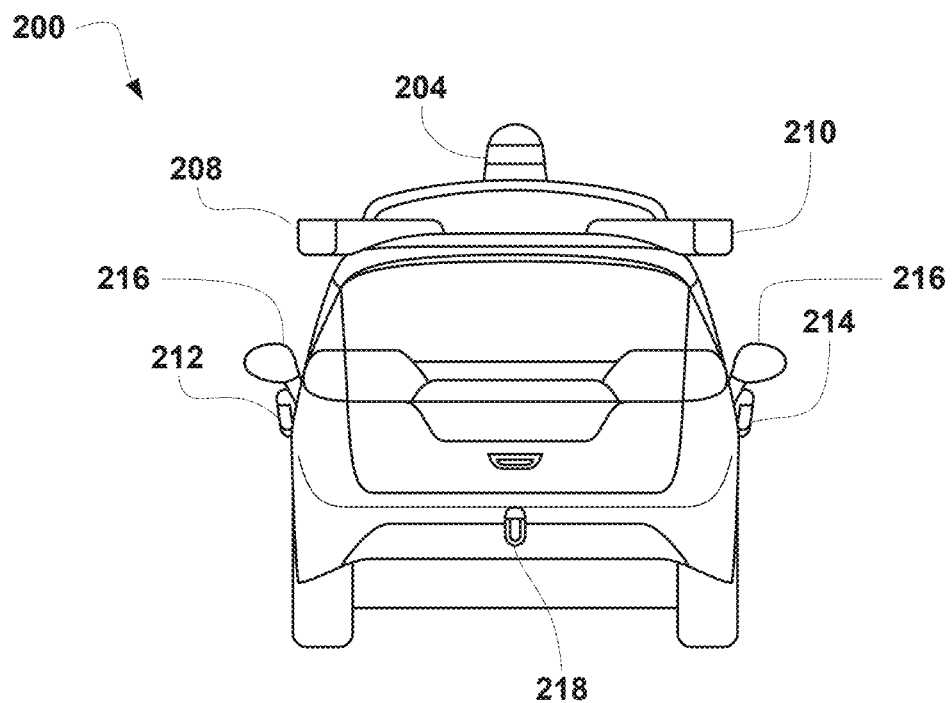
FIG. 2D is an illustration of a physical configuration of a vehicle, according to example embodiments.
Figure 2E:
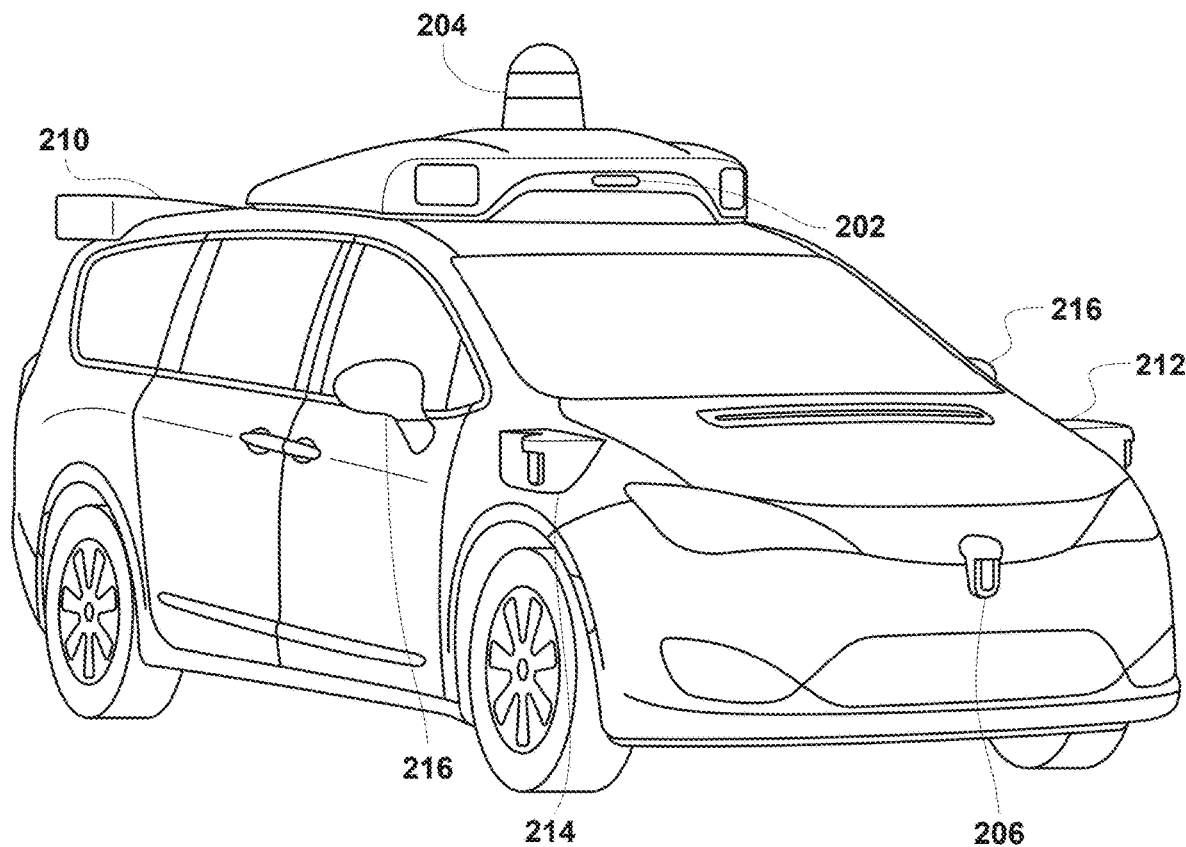
FIG. 2E is an illustration of a physical configuration of a vehicle, according to example embodiments.
Figure 2F:
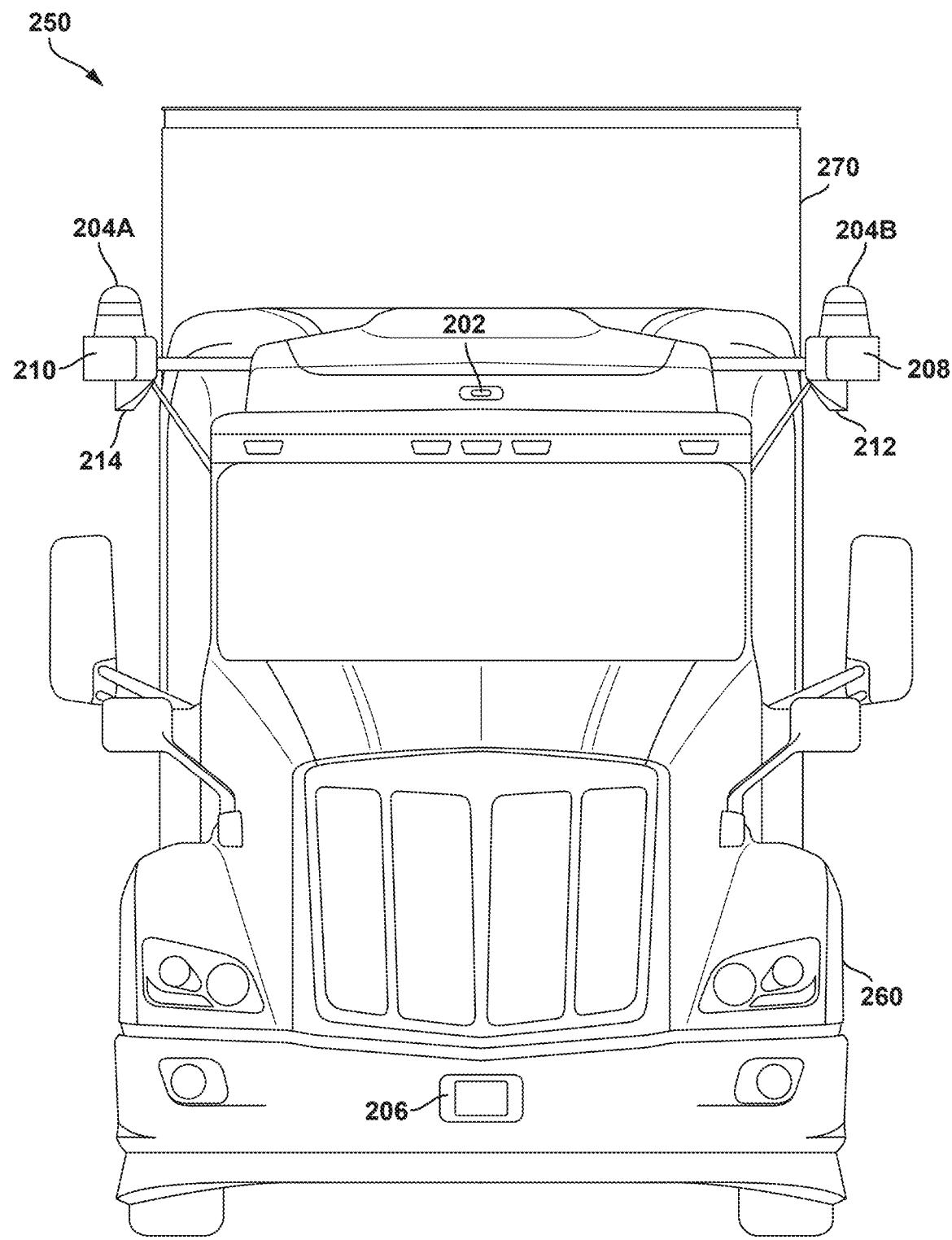
FIG. 2F is an illustration of a physical configuration of a vehicle, according to example embodiments.
Figure 2G:
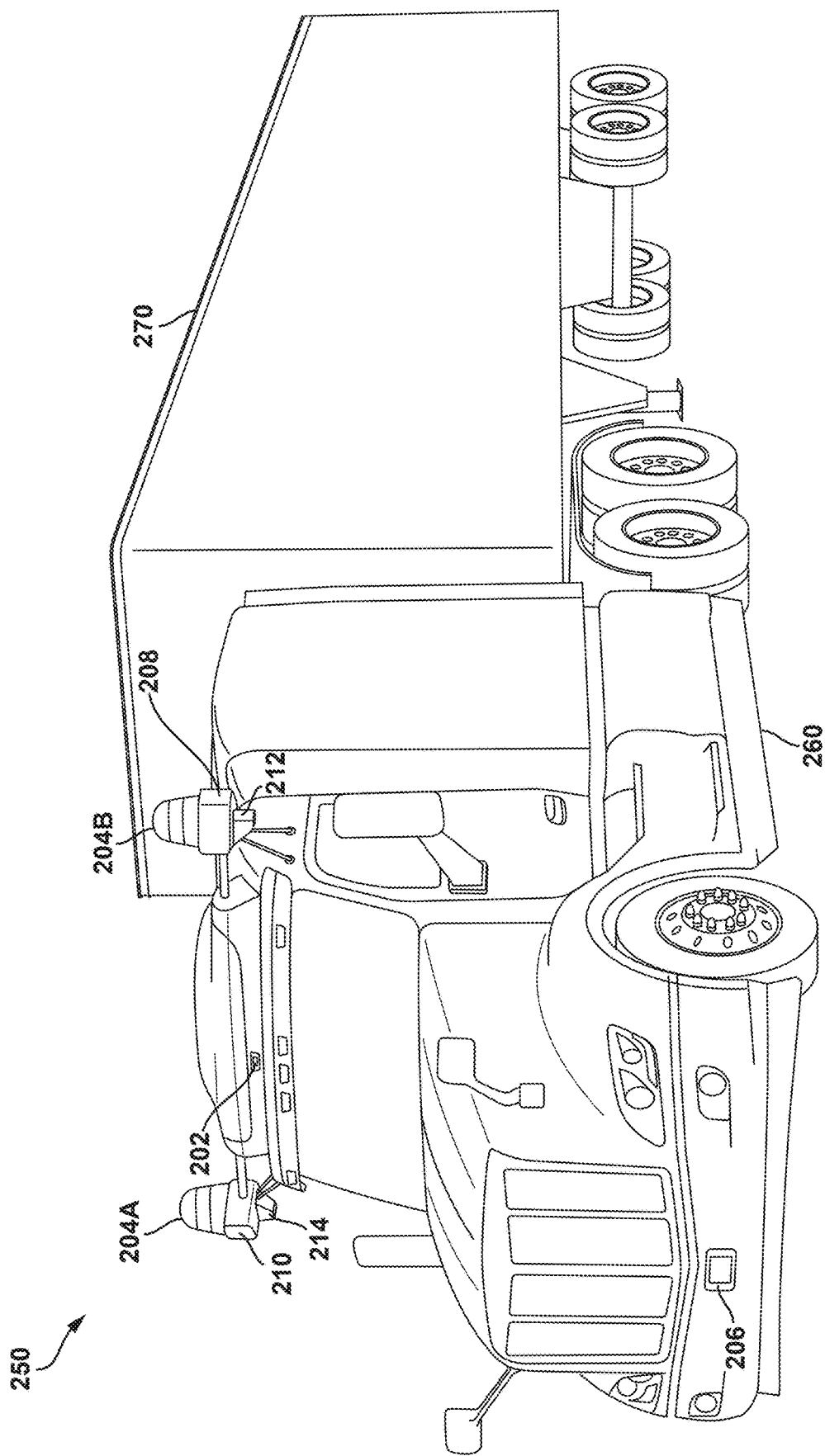
FIG. 2G is an illustration of a physical configuration of a vehicle, according to example embodiments.
Figure 2H:
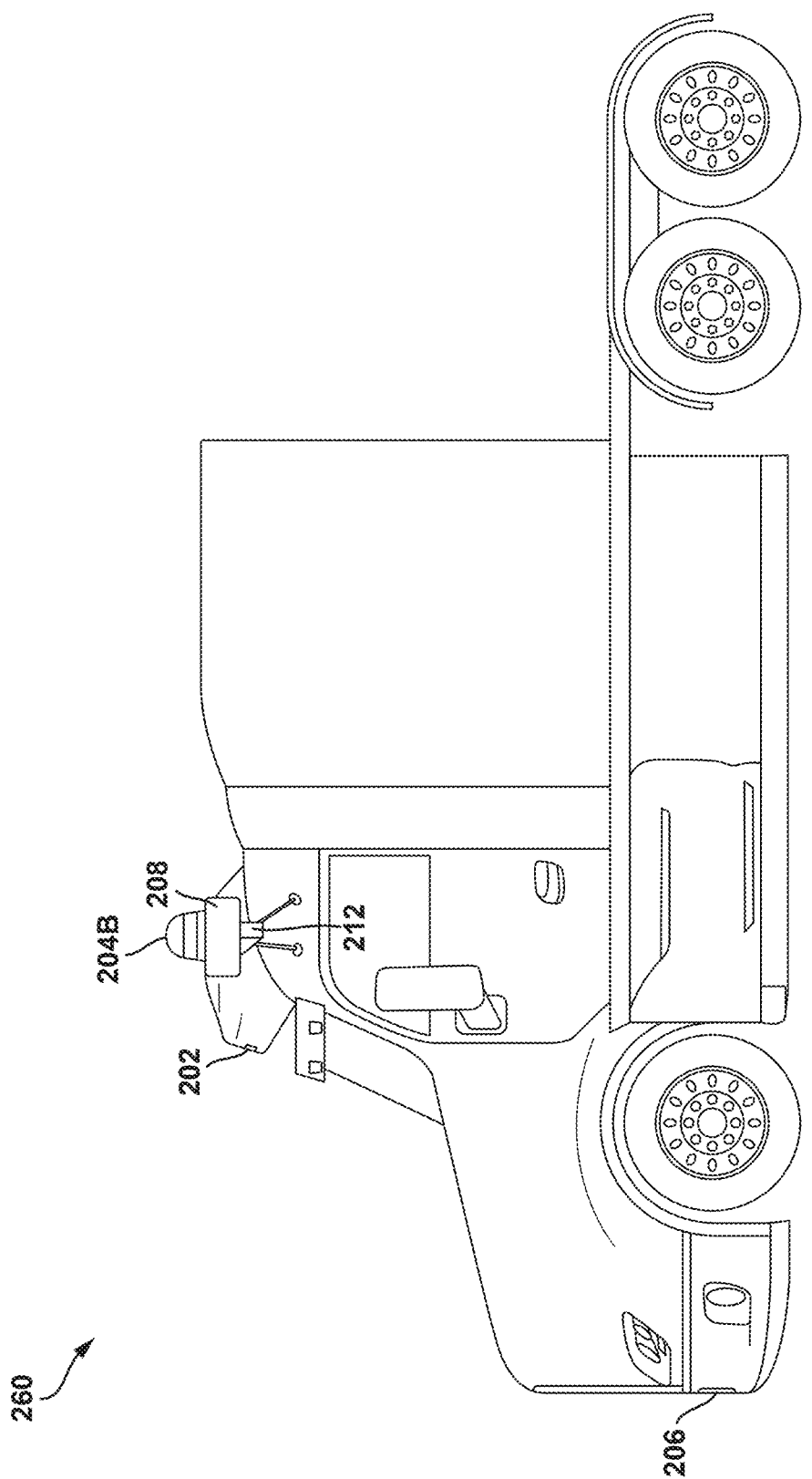
FIG. 2H is an illustration of a physical configuration of a vehicle, according to example embodiments.
Figure 2I:
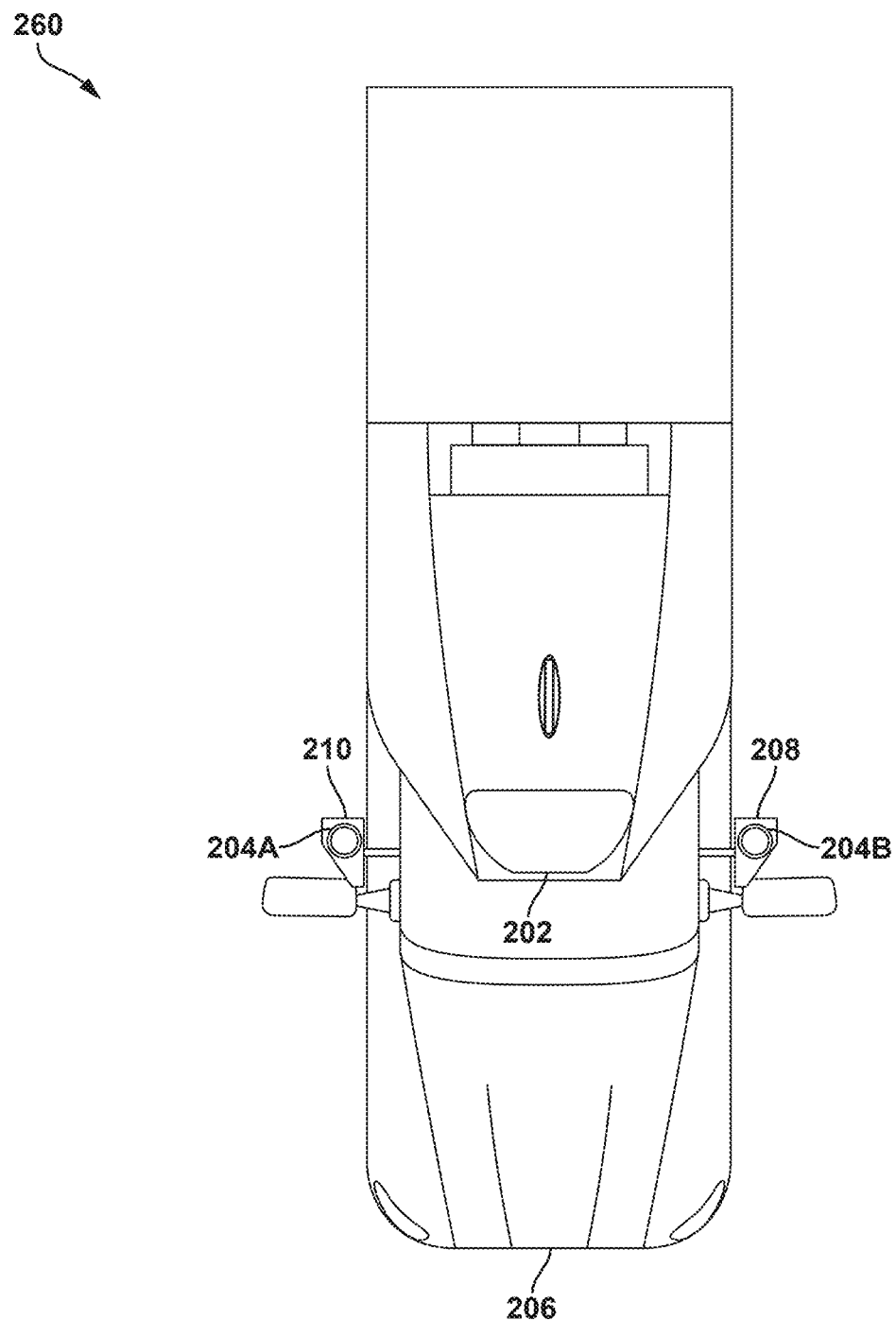
FIG. 2I is an illustration of a physical configuration of a vehicle, according to example embodiments.

As described above, in some embodiments, the vehicle 200 may take the form of a van, but alternate forms are also possible and are contemplated herein. As such, FIGS. 2F-2I illustrate embodiments where a vehicle 250 takes the form of a semi-truck. For example, FIG. 2F illustrates a front-view of the vehicle 250 and FIG. 2G illustrates an isometric view of the vehicle 250. In embodiments where the vehicle 250 is a semi-truck, the vehicle 250 may include a tractor portion 260 and a trailer portion 270 (illustrated in FIG. 2G). FIGS. 2H and 2I provide a side view and a top view, respectively, of the tractor portion 260. Similar to the vehicle 200 illustrated above, the vehicle 250 illustrated in FIGS.

2F-2I may also include a variety of sensor systems (e.g., similar to the sensor systems 202, 206, 208, 210, 212, 214 shown and described with reference to FIGS. 2A-2E). In some embodiments, whereas the vehicle 200 of FIGS. 2A-2E may only include a single copy of some sensor systems (e.g., the sensor system 204), the vehicle 250 illustrated in FIGS. 2F-2I may include multiple copies of that sensor system (e.g., the sensor systems 204A and 204B, as illustrated).

While drawings and description throughout may reference a given form of vehicle (e.g., the semi-truck vehicle 250 or the van vehicle 200), it is understood that embodiments described herein can be equally applied in a variety of vehicle contexts (e.g., with modifications employed to account for a form factor of vehicle). For example, sensors and/or other components described or illustrated as being part of the van vehicle 200 could also be used (e.g., for navigation and/or obstacle detection and avoidance) in the semi-truck vehicle 250

FIG. 2J illustrates various sensor fields of view (e.g., associated with the vehicle 250 described above). As described above, vehicle 250 may contain a plurality of sensors/sensor units. The locations of the various sensors may correspond to the locations of the sensors disclosed in FIGS. 2F-2I, for example. However, in some instances, the sensors may have other locations. Sensors location reference numbers are omitted from FIG. 2J for simplicity of the drawing. For each sensor unit of vehicle 250, FIG. 2J illustrates a representative field of view (e.g., fields of view labeled as 252A, 252B, 252C, 252D, 254A, 254B, 256, 258A, 258B, and 258C). The field of view of a sensor may include an angular region (e.g., an azimuthal angular region and/or an elevational angular region) over which the sensor may detect objects.

Figure 2K:
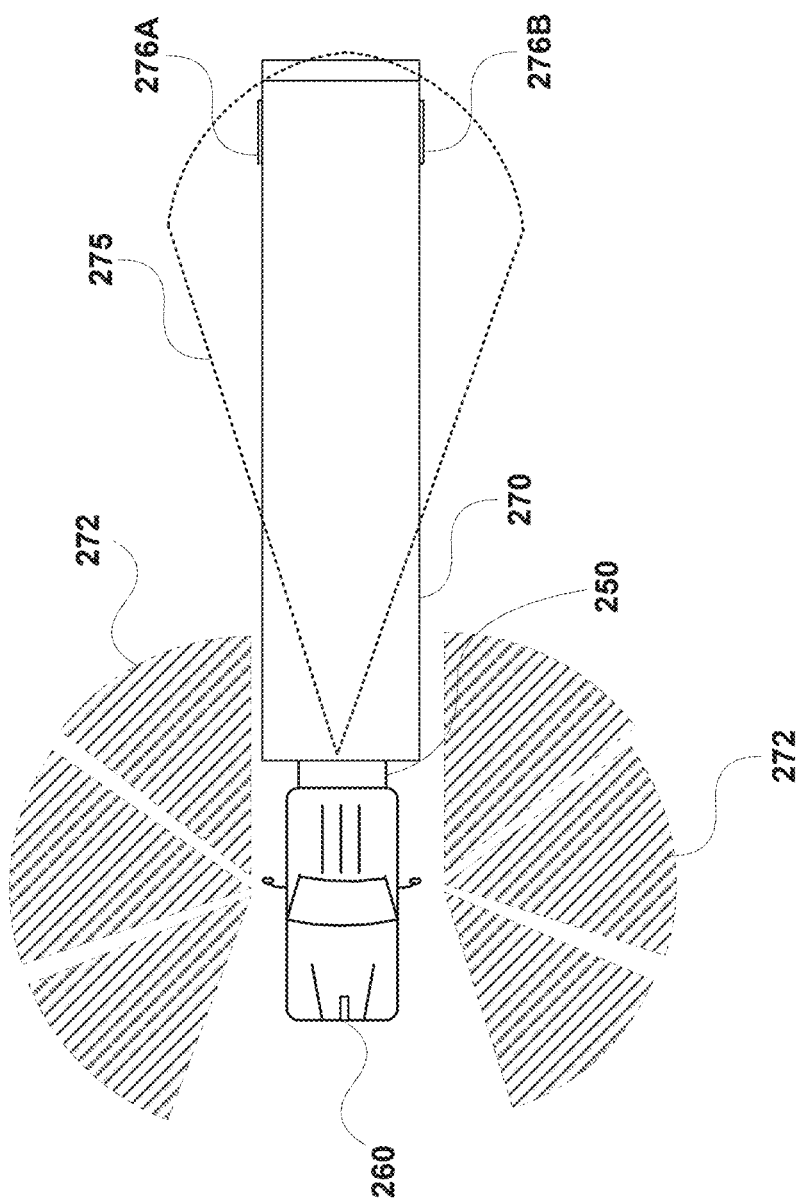
FIG. 2K is an illustration of beam steering for a sensor, according to example embodiments.

FIG. 2K illustrates beam steering for a sensor of a vehicle (e.g., the vehicle 250 shown and described with reference to FIGS. 2F-2J), according to example embodiments. In various embodiments, a sensor unit of vehicle 250 may be a radar, a lidar, a sonar, etc. Further, in some embodiments, during the operation of the sensor, the sensor may be scanned within the field of view of the sensor. Various different scanning angles for an example sensor are shown as regions 272, which each indicate the angular region over which the sensor is operating. The sensor may periodically or iteratively change the region over which it is operating. In some embodiments, multiple sensors may be used by vehicle 250 to measure regions 272. In addition, other regions may be included in other examples. For instance, one or more sensors may measure aspects of the trailer 270 of vehicle 250 and/or a region directly in front of vehicle 250.

At some angles, region of operation 275 of the sensor may include rear wheels 276A, 276B of trailer 270. Thus, the sensor may measure rear wheel 276A and/or rear wheel 276B during operation. For example, rear wheels 276A, 276B may reflect lidar signals or radar signals transmitted by the sensor. The sensor may receive the reflected signals from rear wheels 276A, 276. Therefore, the data collected by the sensor may include data from the reflections off the wheel.

In some instances, such as when the sensor is a radar, the reflections from rear wheels 276A, 276B may appear as noise in the received radar signals. Consequently, the radar may operate with an enhanced signal to noise ratio in instances where rear wheels 276A, 276B direct radar signals away from the sensor.

Figure 3:
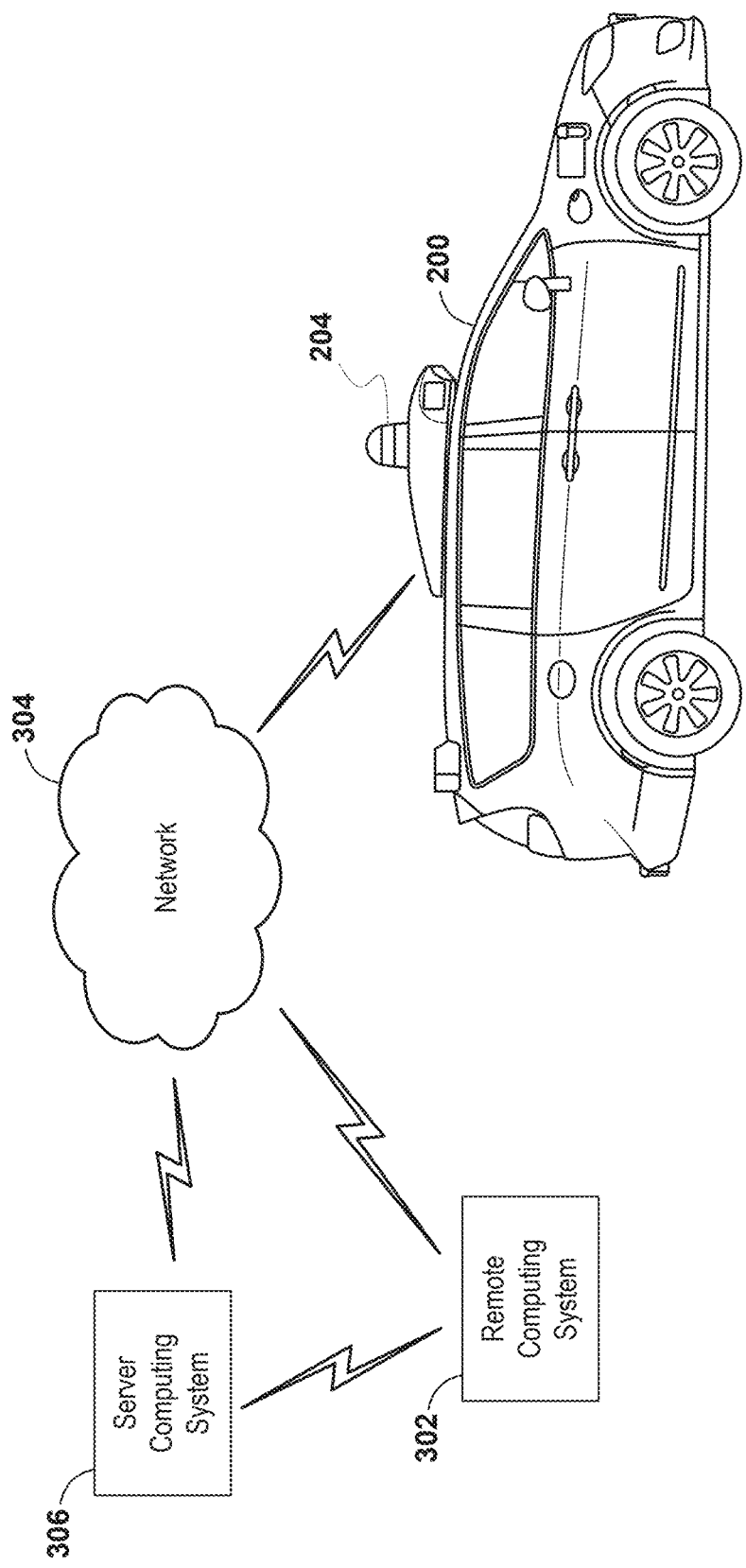
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone, etc.), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, a computing system local to vehicle 200, etc.) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200, etc.) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light, etc.) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals, etc.), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present, etc.), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign, etc.), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304, etc.), and in some embodiments, via a server (e.g., server computing system 306, etc.). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction, etc.), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign, etc.), but may be configured to request remote assistance at the same time as (or at a later time from) when the vehicle operates in accordance with the detected object.

FIGS. 4A-4F illustrate a microphone module 400 and its components, according to example embodiments. In some examples, the microphone module 400 may include one or more microphones 402, a housing 404, a first barrier 406, a second barrier 408, and a third barrier 410.

In some examples, the microphone 402 could be mounted on a printed circuit board (PCB) 403 so as to be acoustically coupled to an opening 405 in the PCB 403. In some forms, the microphone 402 is a micro-electromechanical systems (MEMS) microphone. Other types of microphones could be used as well.

As shown, the housing 404 has an internal cavity 412 having a proximal opening 414 and a distal opening 416. The housing 404 may further comprise a plurality of cavities, each of which may be coupled to substantially similar structures including a plurality of barriers 406, 408, and 410, and a microphone 402. For clarity, only the structures within only one of the cavities, internal cavity 412, are numbered.

In some forms, the housing 404 includes an attachment structure 424 for coupling the microphone module 400 to a vehicle. As shown, the attachment structure 424 includes at least one mounting hole for attachment by means of a screw, bolt, nut, and/or washer. It is understood that other attachment structures can be used, such as bolts, clips, and/or adhesives, as well as a plurality of any of these structures.

Figure 4A:
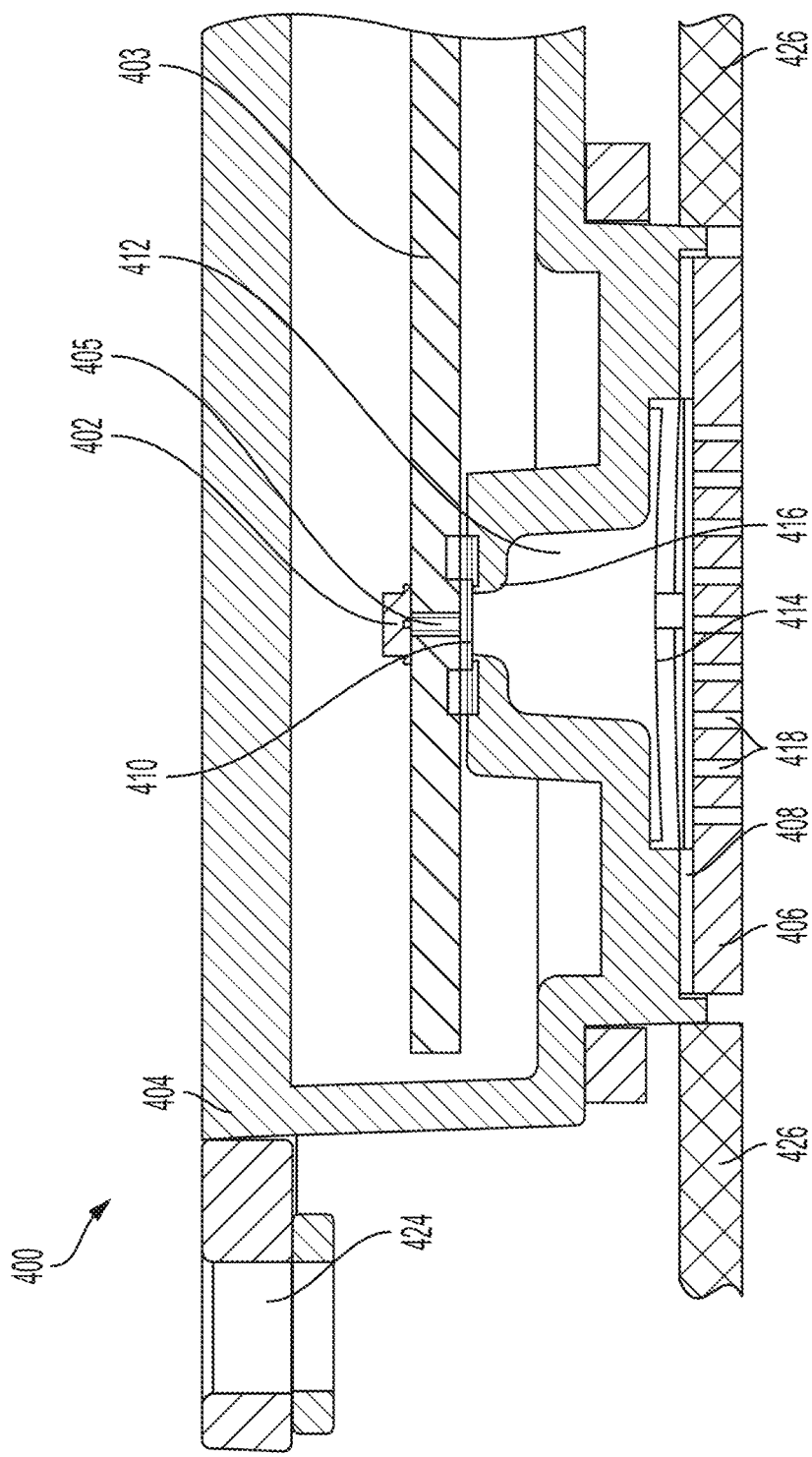
FIGS. 4A and 4B depict example sensor modules, according to example embodiments.

As shown in FIG. 4A, the internal cavity 412 has a converging shape, with a larger cross-sectional area near the proximal opening 414 and a smaller cross-sectional area near the distal opening 416 and microphone 402. The converging shape directs sound toward the microphone 402. In some embodiments, the converging shape of the internal cavity 412 is a tapered shape.

A first barrier 406 is positioned proximate the proximal opening 414 of the internal cavity 412. The first barrier 406 is a rigid mesh or a perforated plate. In one example, the first barrier 406 is a stainless steel woven mesh. Alternatively, the mesh is formed of other materials, such as other metals, plastic, or a fiber-resin material. In some embodiments, the first barrier 406 is integrally formed with the housing 404. As shown in FIG. 4A, the first barrier 406 can be exposed to an external environment, such as through an opening in an external surface 426 of the vehicle. The external surface 426 could be, for example, a roof top of the vehicle.

The first barrier 406 has a sufficient perforation ratio to be substantially acoustically transparent. For example, the first barrier 406 could have a perforation ratio of at least 33%. In some embodiments, the first barrier 406 has a perforation ratio of between about 40% and about 50%.

Figure 4B:
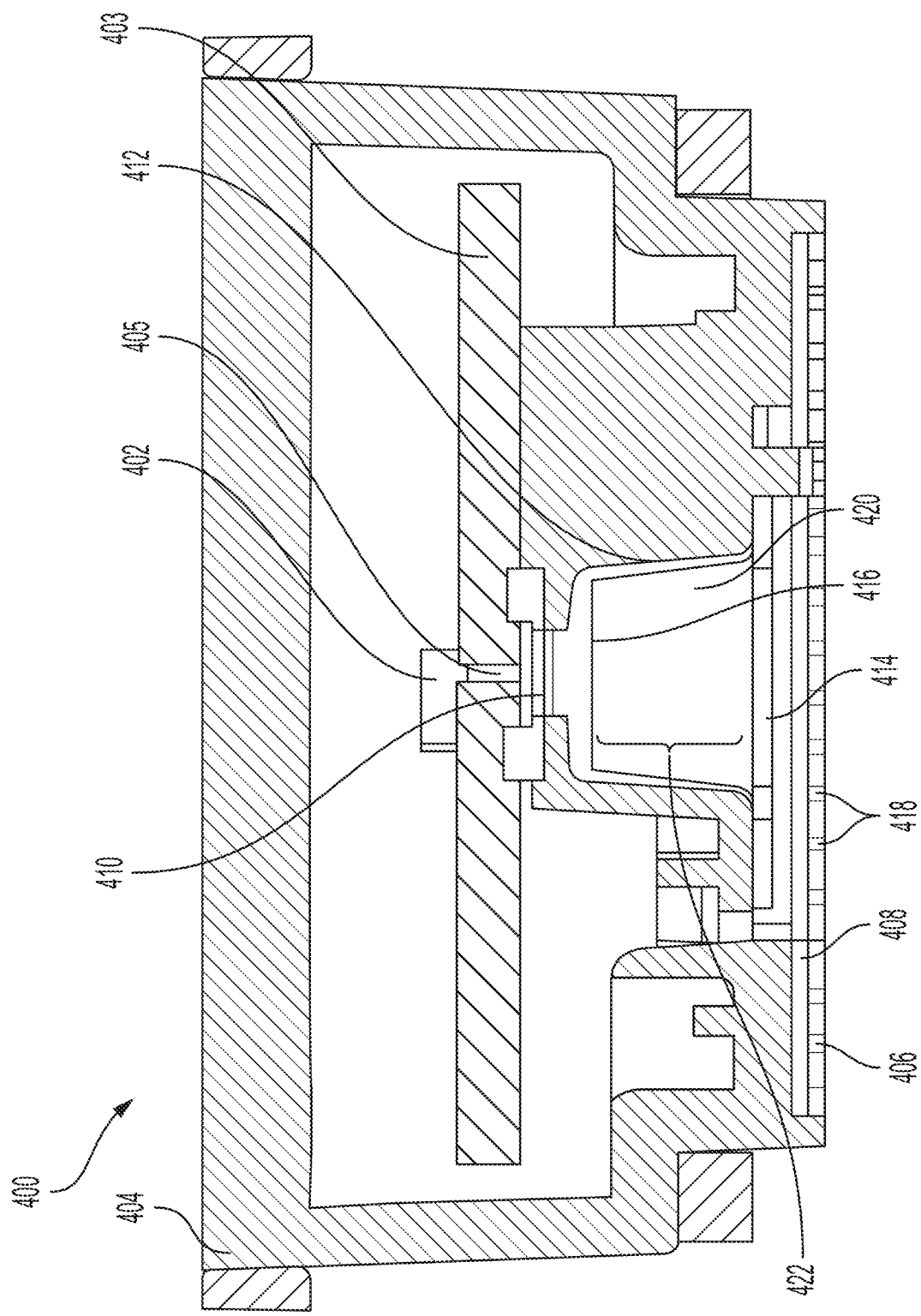
Figure 4C:
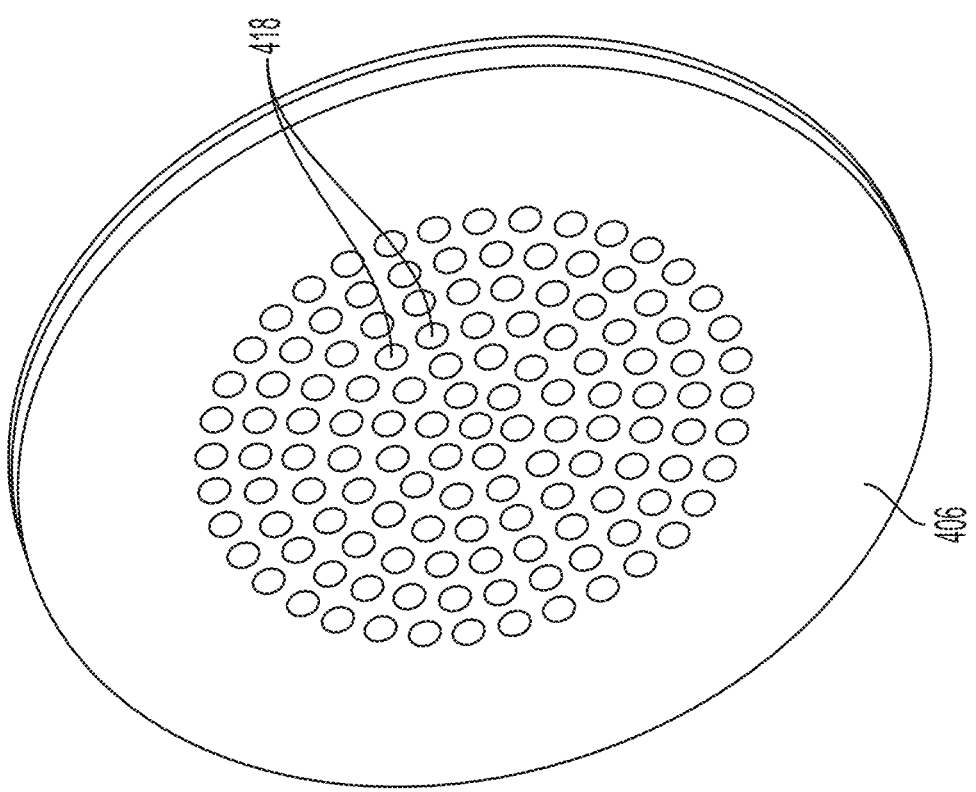
FIG. 4C depicts a microphone component, according to example embodiments.

In some embodiments, the first barrier 406, as depicted in FIG. 4C, is a perforated plate having a thickness between 1 and 2 millimeters. The perforated plate of the first barrier 406 comprises a plurality of perforations 418, each perforation having a diameter between 0.5 and 1 millimeters. In some embodiments, the ratio between perforated plate thickness of the first barrier 406 and the diameter of each perforation in the perforated plate of the first barrier 406 is 1:1, as depicted in FIG. 4C. In other embodiments, the ratio between perforated plate thickness of the first barrier 406 and the diameter of each perforation in the perforated plate of the first barrier 406 is 2:1. In some embodiments, the perforated plate has a perforation ratio between 30% and 50%. The shown embodiment has round perforations 418 in the first barrier 406. It is understood that other shapes of perforations 418 can be used, such as hexagonal perforations or slit shaped perforations.

In operation, the first barrier 406 inhibits the passage of debris, such as debris having a size larger than the perforations 418, from passing through to the internal cavity 412. This serves to protect the microphone 402 from common road debris, such as ice, hail, gravel, or other debris.

The second barrier 408 is positioned between the first barrier 406 near the proximal opening 414 of the internal cavity 412 and the microphone 402. The second barrier 408 is formed of a finer mesh than the first barrier 406 so as to form a dust tight seal. Example second barriers 408 have an IP rating of IP5x or IP6x. In some examples, the second barrier 408 is formed of a mesh fabric, such as a polyester monofilament fabric. The second barrier 408 has an acoustic impedance of less than about 100 ohm/cm2. In some forms, the second barrier 408 has an acoustic impedance of less than about 75 ohm/cm2. The second barrier 408 has a pore size of less or equal to about 15 micrometers. In some forms, the second barrier 408 has a pore size of about 12 micrometers.

In some embodiments, the second barrier 408 is coupled to the inner surface of the first barrier 406 by a ring of adhesive tape. In some forms, other types of connections are used, such as adhesive. In another form, the second barrier 408 can be attached by other materials, such as plastic, through injection molding. In some examples, the ring spaces the second barrier 408 from the first barrier 406. A second ring of adhesive tape may be used to couple the second barrier 406 to the housing 404.

In operation, the second barrier 408 inhibits the passage of dust into the internal cavity 412. The second barrier 408 is air permeable. Accordingly air and sound pass through the second barrier 408 into the interior cavity 412. In some forms, the second barrier 408 is water permeable.

The third barrier 410 is positioned within the internal cavity 412 near the distal opening 416 between the second barrier 408 and the microphone 402. The third barrier 410 is formed of a water impermeable material, such as Gore®-Tex or Gore-Vent®. The third barrier 410 forms a water tight seal around the opening 405 in the PCB 403. In some examples, the third barrier 410 has a rating of between IP62 and IP68. In one example, the third barrier 410 has a rating of IP67. In operation, the third barrier 410 inhibits liquid that passes through the internal cavity 412 from contacting the microphone 402, a circuit board, or any other internal components.

In some embodiments, the third barrier 410 is spaced from the first barrier 406 by a distance of at least about 2 mm. This spacing reduces the vibration of the third barrier 410 caused by laminar flow of air around the first barrier 406.

In alternative embodiments, the third barrier 410 is air impermeable. The third barrier 410 acts as a diaphragm that vibrates in response to sound in the first portion of the internal cavity 412. The vibration of the third barrier 410 reproduces the sound in the second portion of the cavity 412, where it is detected by the microphone 402.

The microphone module 400 may include three barriers 406, 408, and 410 that provide escalating levels of ingress protection. In alternative embodiments, only two barriers are used to provide escalating ingress protections. For example, the second barrier 408 or the third barrier 410 could be omitted. In still further alternatives, additional barriers could be added in order of escalating ingress protection.

Figure 4F:
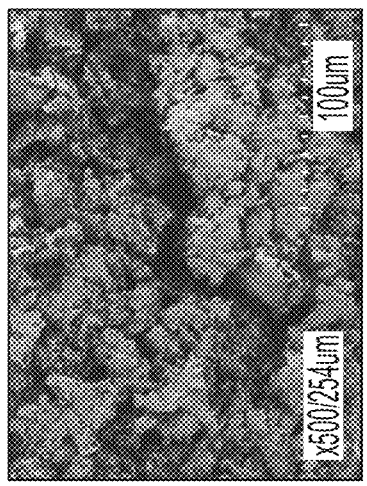
FIGS. 4D-4F depict example porous plastic materials, according to example embodiments.
Figure 4E:
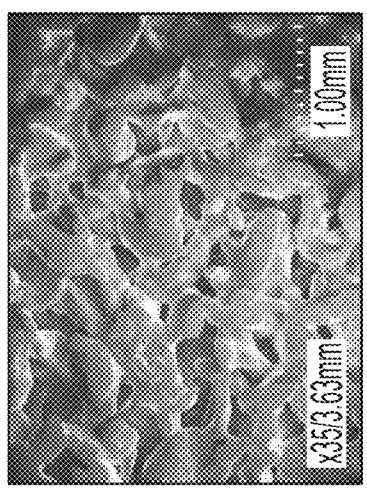
Figure 4D:
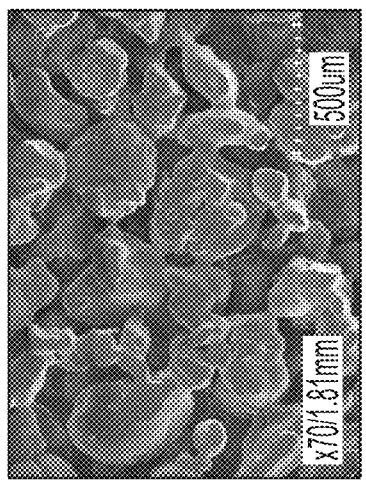

In some embodiments, a porous plastic material 420 is disposed within the internal cavity 412, as shown in FIG. 4B. The porous plastic material 420 may fill a particular portion 422 of the internal cavity 412 such that the particular portion 422 of the internal cavity 412 is located between the proximal opening 414 and the distal opening 416 of the internal cavity 412. In some embodiments, the porous plastic material 420 may comprise polyethylene, as shown in FIG. 4D, polypropylene, as shown in FIG. 4E, polyvinylidene fluoride, polytetrafluoroethylene, as shown in FIG. 4F, or the like. For instance, the porous plastic material 420 could be a nylon, an ethyl vinyl acetate, a polycarbonate, an elastomer, or a range of other thermoplastics. In some embodiments, the porous plastic material 420 may be a sintered material.

In some embodiments, the porous plastic material 420 includes a material that has a pore size between 10 microns and 50 microns. In some embodiments, the porous plastic material 420 has a pore volume between 20% and 65%.

In some embodiments, the porous plastic material 420 could be attached to an interior surface of the internal cavity 412 at the particular portion 422 by an adhesive material, such as a glue, an epoxy, or the like. In some embodiments, the internal cavity 412 of the sensor module 400 has a tapered shape such that a cross-sectional area of the internal cavity 412 decreases with increasing distance from the proximal opening 414. In such embodiments, the porous plastic material 420 may completely fill the cross-sectional area of the internal cavity 412 in the particular portion 422 of the internal cavity 412 between the proximal opening 414 and the distal opening 416. In some embodiments, the porous plastic material 420 may be spaced apart by a clearance from the second barrier 408 such that the second barrier 408 and the porous plastic material 420 do not contact each other anywhere along the cross-sectional area of the internal cavity 412.

In some embodiments, the porous plastic material 420 may be configured to filter out unwanted or extraneous noise data from passing the distal opening 416 of the internal cavity 412 from microphone 402. In some examples, the sensor module 400 shown in FIGS. 4A-4F may be incorporated onto a vehicle. In some embodiments, that vehicle may be an autonomous vehicle. As such, the porous plastic material 420 within sensor module 400 may filter out unwanted noise data from the microphone 402 such that a control system of the vehicle may be communicably coupled to the sensor module 400 or the microphone module such that the control system may receive audio data from the at least one microphone 402 without the extraneous noise data. In some examples, the control system may be configured to control operation of the vehicle based on the audio data.

FIG. 5 depicts a graph 500 showing the power spectral density (PSD) of the wind noise cases at 0 degrees. Data line 502 depicts the relationship between the PSD of an unaltered microphone in relation to the frequency it picks up in Hz. Data line 504 depicts the relationship between the PSD of a microphone with a first barrier having a 0.5 mm hole diameter and a 1 mm thickness in relation to the frequency it picks up in Hz. Data line 506 depicts the relationship between the PSD of a microphone with a first barrier having a 1 mm hole diameter and a 1 mm thickness in relation to the frequency it picks up in Hz. Data line 508 depicts the relationship between the PSD of a microphone with a first barrier having a 0.5 mm hole diameter and a 2 mm thickness in relation to the frequency it picks up in Hz. Data line 510 depicts the relationship between the PSD of a microphone with a porous plastic material (Porex) with a 15 micron pore size in relation to the frequency it picks up in Hz. Data line 512 depicts the relationship between the PSD of a microphone with a first barrier having a 0.5 mm hole diameter and a 1 mm thickness in addition to a porous plastic material (Porex) with a 15 micron pore size in relation to the frequency it picks up in Hz. As evidenced by the data set in graph 500, the data line 512 shows that while the porous plastic material and the first barriers aid in dampening the PSD of the unaltered microphone on its own, the combination illustrated by data line 512 performs better.

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed:

1. A sensor module comprising:
   a housing defining an internal cavity, wherein the internal cavity has a proximal opening and a distal opening;
   a first barrier, wherein the first barrier covers the proximal opening of the internal cavity;
   a second barrier, wherein the second barrier is positioned between the first barrier and the proximal opening of the internal cavity;
   at least one microphone acoustically coupled to the distal opening of the internal cavity; and
   a porous plastic material that fills a particular portion of the internal cavity, wherein the particular portion is located between the proximal opening and the distal opening.

2. The sensor module of claim 1, wherein the porous plastic material comprises at least one of polyethylene, polypropylene, polyvinylidene fluoride, or polytetrafluoroethylene.

3. The sensor module of claim 1, wherein the porous plastic material has a pore size between 10 microns and 50 microns.

4. The sensor module of claim 1, wherein the porous plastic material has a pore volume between 20% and 65%.

5. The sensor module of claim 1, wherein the porous plastic material is attached to an interior surface of the internal cavity by an adhesive material.

6. The sensor module of claim 1, wherein the internal cavity has a tapered shape such that a cross-sectional area of the internal cavity decreases with increasing distance from the proximal opening.

7. The sensor module of claim 6, wherein the porous plastic material completely fills the cross-sectional area of the internal cavity in the particular portion of the internal cavity.

8. The sensor module of claim 1, wherein the first barrier comprises a perforated plate.

9. The sensor module of claim 8, wherein the perforated plate has a plurality of perforations, each perforation having a diameter between 0.5 and 1 millimeters.

10. The sensor module of claim 9, wherein perforated plate has a thickness between 1 and 2 millimeters.

11. The sensor module of claim 8, wherein the perforated plate has a perforation ratio of between 30% and 50%.

12. The sensor module of claim 1, wherein the second barrier comprises an acoustic mesh.

13. The sensor module of claim 1, wherein the acoustic mesh comprises polyester monofilaments that define pores, wherein the pores have a size between 10 and 15 microns.

14. The sensor module of claim 1, wherein the second barrier is attached to the first barrier.

15. The sensor module of claim 1, wherein the porous plastic material is spaced apart from the second barrier.

16. The sensor module of claim 1, further comprising a third barrier positioned between the at least one microphone and the distal opening of the internal cavity, wherein the third barrier comprises a water impermeable membrane.

17. A vehicle comprising:
a microphone module including:
  a housing defining an internal cavity, wherein the internal cavity has a proximal opening and a distal opening;
  a first barrier, wherein the first barrier covers the proximal opening of the internal cavity;
  a second barrier, wherein the second barrier is positioned between the first barrier and the proximal opening of the internal cavity;
  at least one microphone acoustically coupled to the distal opening of the internal cavity; and
  a porous plastic material that fills a particular portion of the internal cavity, wherein the particular portion is located between the proximal opening and the distal opening; and
a control system communicably coupled to the microphone module to receive audio data from the at least one microphone.

18. The vehicle of claim 17, wherein the porous plastic material has a pore size between 10 microns and 50 microns.

19. The vehicle of claim 17, wherein the first barrier comprises a perforated plate, wherein the second barrier comprises an acoustic mesh.

20. The vehicle of claim 17, wherein the control system is configured to control operation of the vehicle based on the audio data.

* * * * *